United States Patent [19]

Olney et al.

[11] 4,235,160
[45] Nov. 25, 1980

[54] PROCESS FOR MAKING FILTER CUPS

[75] Inventors: Wallace E. Olney; Robert G. Wright, both of Portage, Mich.

[73] Assignee: Brown Company, Kalamazoo, Mich.

[21] Appl. No.: 917,686

[22] Filed: Jun. 21, 1978

Related U.S. Application Data

[62] Division of Ser. No. 686,109, May 13, 1976, Pat. No. 4,098,177.

[51] Int. Cl.³ .................... B31D 5/00; B31F 7/00
[52] U.S. Cl. ............................ 493/63; 83/188; 493/74; 493/154
[58] Field of Search .......... 93/60, 58.4, 58 R, 58 P, 93/58.5, 1 D; 99/310; 83/54, 188; 264/323

[56] References Cited

U.S. PATENT DOCUMENTS

| | | | |
|---|---|---|---|
| 2,772,735 | 12/1956 | Wakelee | 83/188 X |
| 3,550,421 | 12/1970 | Stakel | 93/60 X |
| 4,075,107 | 2/1978 | Smith | 93/1 D X |
| 4,094,234 | 6/1978 | Olney et al. | 99/310 |
| 4,101,627 | 7/1978 | Menier | 264/323 |

Primary Examiner—Robert D. Baldwin
Attorney, Agent, or Firm—Gordon W. Hueschen

[57] ABSTRACT

A percolator having a cylindrical basket concentric with a wand is provided with a filter paper cup having an annular bottom coextensive with the bottom of the basket and having upstanding fluted sides. The filter cups are formed by cutting and forming them into a nest of cups having an imperforate bottom, transferring the nest of cups to a frusto-conical die having a circular top commensurate with the circular bottom of the filter cups, a central die-hole, and outwardly and downwardly flaring sides corresponding to the natural outward flare of the nested cups, and punching an axial hole in said nested cups while on said die by means of a punch complementary with said die-hole.

14 Claims, 8 Drawing Figures

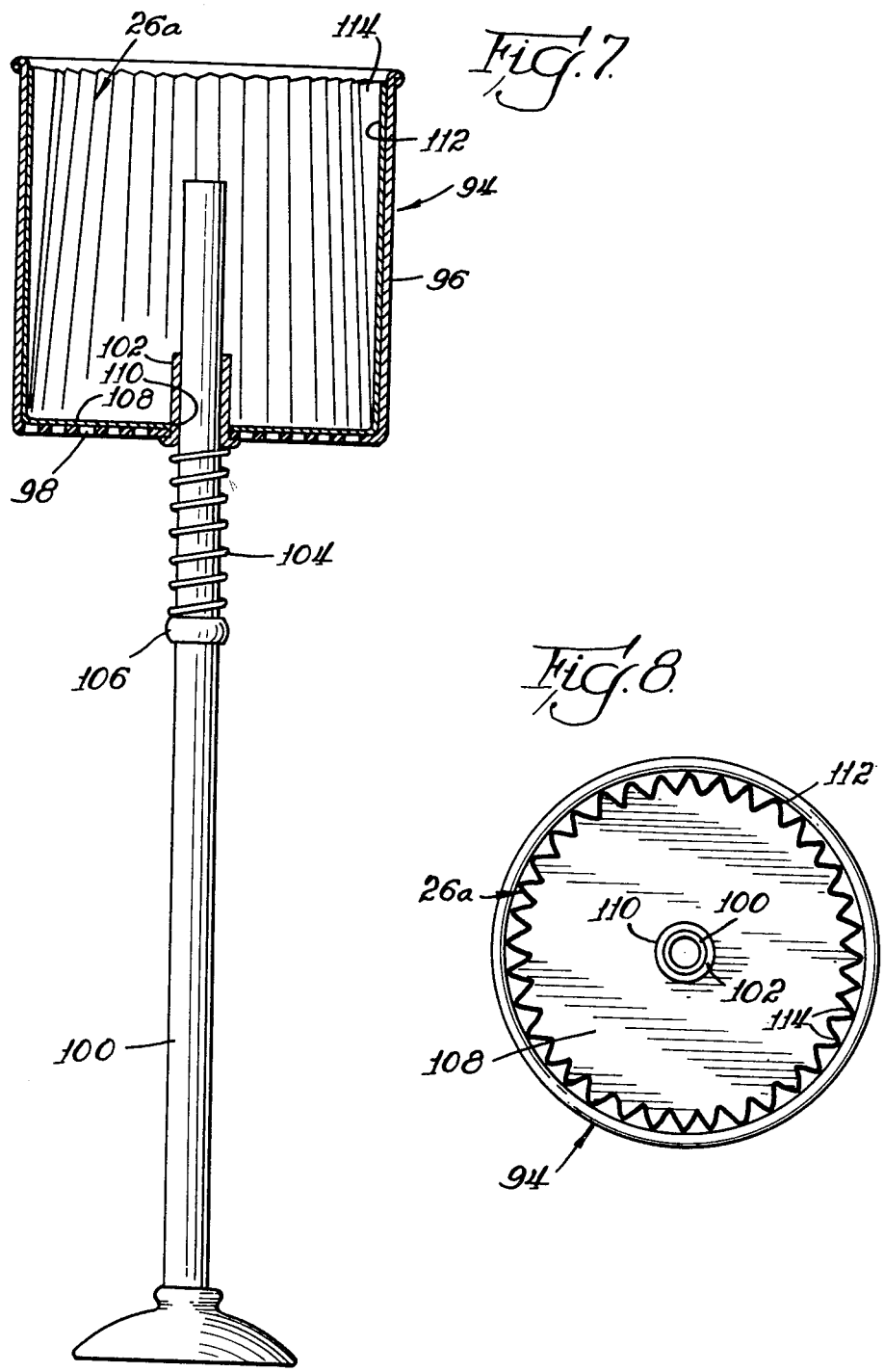

PROCESS FOR MAKING FILTER CUPS

This is a division of application Ser. No. 686,109, filed May 13, 1976, now U.S. Pat. No. 4,098,177 issued July 4, 1978.

BACKGROUND OF THE INVENTION AND PRIOR ART

The invention relates to apparatus for making coffee and is particularly directed to improvements in percolators for this purpose.

There are types of coffee makers now available in which the coffee is brewed and filtered in an automatic or semiautomatic process. Still, many people believe that brewing coffee is an art rather than a science and prefer apparatus such as percolators where art rather than science goes into the making of the coffee. It has been proposed, heretofore, to use filter cups of sorts in percolators but such as have been available have been expensive, inelegant, and relatively ineffective.

OBJECT OF THE INVENTION

It is an object of the invention to provide a new and improved percolator. It is a further object of the invention to provide percolators having disposable filters which are elegant, inexpensive and efficient. It is a further object of the invention to provide such disposable filter cups suitable for use in percolators. Still a further object of the invention is to provide new and improved process for making such filter cups. It is a further object of the invention to avoid the disadvantages of the prior art and to obtain such advantages as will appear as the description proceeds.

BRIEF DESCRIPTION OF THE INVENTION

This invention relates to a new and improved percolator having a cylindrical basket concentric with a tubular wand and a filter paper cut having an annular bottom coextensive with the bottom of said basket and having integral upstanding fluted sidewalls engaging the sidewall of the basket and projecting upwardly from the periphery of said annular bottom; to a process for making the same in which a set of nested cups having a circular bottom and upstanding fluted sidewalls is first formed and then placed on a frusto-conical die having a circular top substantially the same diameter as the central portion of the nested cups, a central die-hole, and sides flaring outwardly and downwardly complementary with the natural outward flare of the side walls of said nested cups, and punching an axial hole in the bottoms of said nested cups by means of a punch complementary to said die-hole; and to the cups so formed.

In carrying out the process of the invention, a plurality of sheets or webs of filter paper are assembled into a composite web and fed into an annular die having a peripheral cutting edge. The male and female portions of the die have radially extending complementary lands and grooves whereby flutes are imparted to the annular portion of the composite disc in said die. The female portion of the die also has a tubular extension having lands and grooves complementary to the lands and grooves in the male die portion. A ram having a diameter essentially the diameter of the cups to be formed then engages the fluted web of filter discs and forces it into said tubular portion, thereby forming a nest of cups. The tubular portion has a tubular extension in which the nested cups are heated and cooled to ambient temperature. The heating may, advantageously, be effected at about 400° to 420° F. With each operation of the die, the nested cups are advanced in the tube a distance equal to the height or length of the nested cups and ultimately, with each operation of the die, a set of nested cups will be ejected from said tube. With each ejection of a set of nested cups, the set is transferred by hand or by suitable machinery to a frusto-conical die having a circular top substantially the same diameter as the central portion of the nested cups, a central die-hole, and sides flaring outwardly and downwardly complementary with the natural outward flare of the sidewalls of the nested cups. A punch complementary with said die then punches an axial hole in the bottom of the set of nested cups.

The filter paper which has been found particularly useful for making the filter cups of the invention consists essentially of pure bleached cellulose fiber from chemically prepared wood pulp fibers. It is uncalendered and unsized, has a 28 to 40 pound basis weight, and a 16 to 15 percent crepe. Other types may be used, however.

The nested cups thus produced have an annular bottom and upstanding sidewalls having accordion pleat-type flutes therein with rectilinear apices and are adapted for insertion into the basket of percolator. For this purpose it is of advantage to have a large number of flutes, preferably 1 flute at least every 10 degrees and, at most, not more than 1 every 15 degrees.

These cups are particularly adapted for use in percolators in which the basket has an axially disposed, tubular collar which projects upwardly from the bottom of the basket and embraces the wand with a sliding fit so that the basket can be removed from the wand. The annular bottom of the filter cup is coextensive with the annular bottom of the basket and extends from the axial collar to the sidewall of the basket. It will be understood, however, that in the broader aspects of the invention, the cups may be designed for use in a percolator in which the basket and the wand are integral, in which case, the axial aperture in the filter cup will have the same diameter as the wand.

The process of the invention is particularly adapted to producing cups having an accurately centered aperture so that when the cups are placed in the basket of the percolator, the annular bottom of the filter cup will be coextensive with the bottom of the basket and the outermost apices of the flutes of the filter cups will be in uniform engagement with the sidewall of the basket.

DETAILED DESCRIPTION OF THE INVENTION

In the Drawings:

FIG. 7 is a side elevation in section of a percolator basket and wand having a filter cup therein.

FIG. 8 is a cross-section of the basket of FIG. 7.

Figure 1:
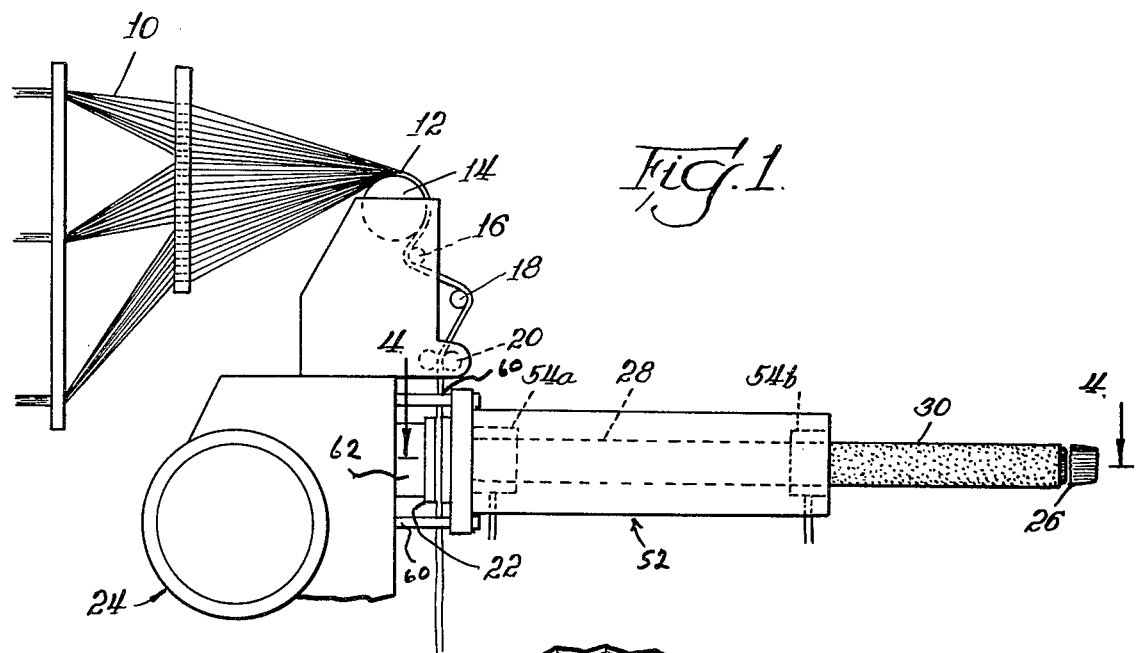
FIG. 1 is a schematic view in side elevation showing how the nested cups are formed.

Referring now, particularly to FIG. 1, a plurality of single sheets or webs 10 of filter paper are assembled as illustrated into a composite web 12, which is fed by suitable roller means 14, 16, 18, and 20 into the forming die 22 operated by the ram press 24, where the composite web 12 is cut and shaped into nested cups 26, which pass through the heating tube 28 and the cooling tube 30.

The roller 18 is constructed and arranged to take up the slack in the composite web during the forming operation, in which case the roller 14 operates continuously. Alternatively, the roller 12 may be operated intermittently to feed the composite web to the forming die 22 as needed.

The forming die 22 is provided with an annular cutting ring 32 operating on the annular anvil 34 and is provided with a female portion 36 and a male portion 38, which latter is operated to and from the position shown in dotted lines by the ram press 24. The female portion 36 of the die 22 is provided with alternating lands 40 and grooves 42 and the male portion is provided with complementary lands and grooves 44 and 46 adapted to form flutes in the annular portion of the cut filter discs which are clamped between the annular portions of the female and male die portions 36 and 38.

The female portion 36 of the forming die 22 has a tubular extension 48 and the lands and grooves 40 and 42 extend into this tubular extension as shown by the dotted lines up to the shoulder 50, where the tubular extension 48 is enlarged to receive the heating and cooling tube 52 which is composed of heating section 28 and cooling section 30.

Figure 4:
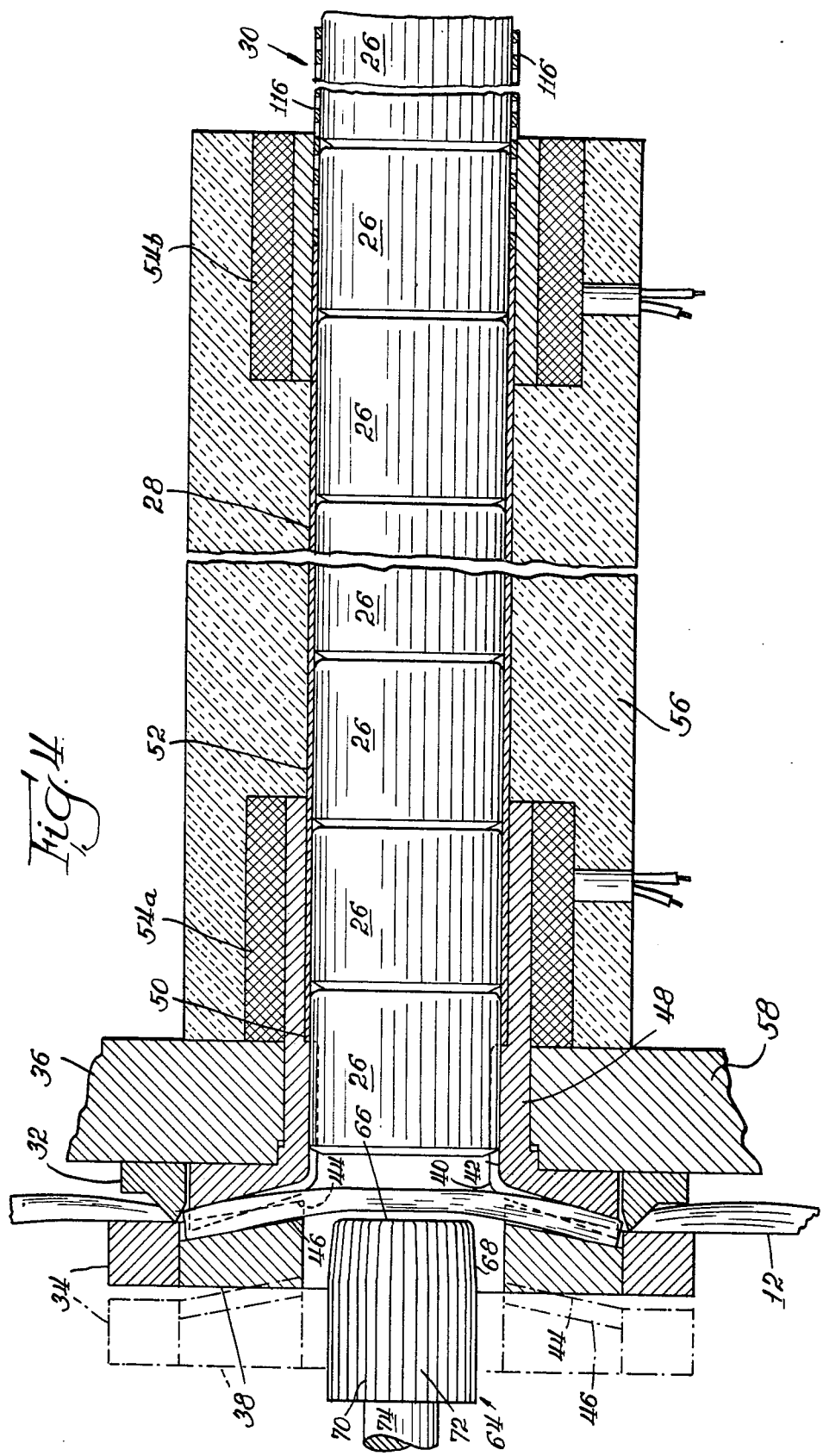
FIG. 4 is a detailed view of the cup-forming die and the heating and cooling tube.

The heating section 28 is provided with one or more heating elements 54 which may be continuous or spaced about its length as shown in FIG. 4, and the whole is lapped with insulating material 56 which may be asbestos, polyurethane foam, or any other suitable insulating material.

The female die 36 with its tubular projection 48 is sweated into or otherwise fastened to a collar 58 which is fastened to the ram press 24 by tie rods 60. The male die member is affixed to the ram 62 of the ram press 24.

The ram 62 is hollow, having a diameter roughly corresponding to that of the forming die. Disposed axially in the hollow ram is a pusher 64, the front end 66 of which has a diameter roughly corresponding to the inside diameter of the nested cups. Advantageously, the pusher 64 may slope outwardly as shown at 68 at an angle of between about 1 and 5 degrees and, if desired, may be fluted to provide alternating lands 70 and grooves 72 corresponding, respectively, to the grooves 42 and lands 40 of the female die 36 and its tubular extension 48. The pusher 64 is affixed to the end of rod 74 which can be actuated by means, not shown, in the ram press 24 to push the composite web out of the die after it has been cut and formed therein and into the tubular extension 48. After repeated operation as above described, the heating and cooling tube 52 will be filled with a plurality of columnarized nested cups 26. Finally, after the requisite number of operations, one set of nested cups 26 will be ejected from the heating and cooling tube 52 as shown in FIG. 1.

The set of nested cups thus ejected is then transferred either by hand or by mechanical means to a die where a center hole is punched in the bottom of the cup.

Figure 5:
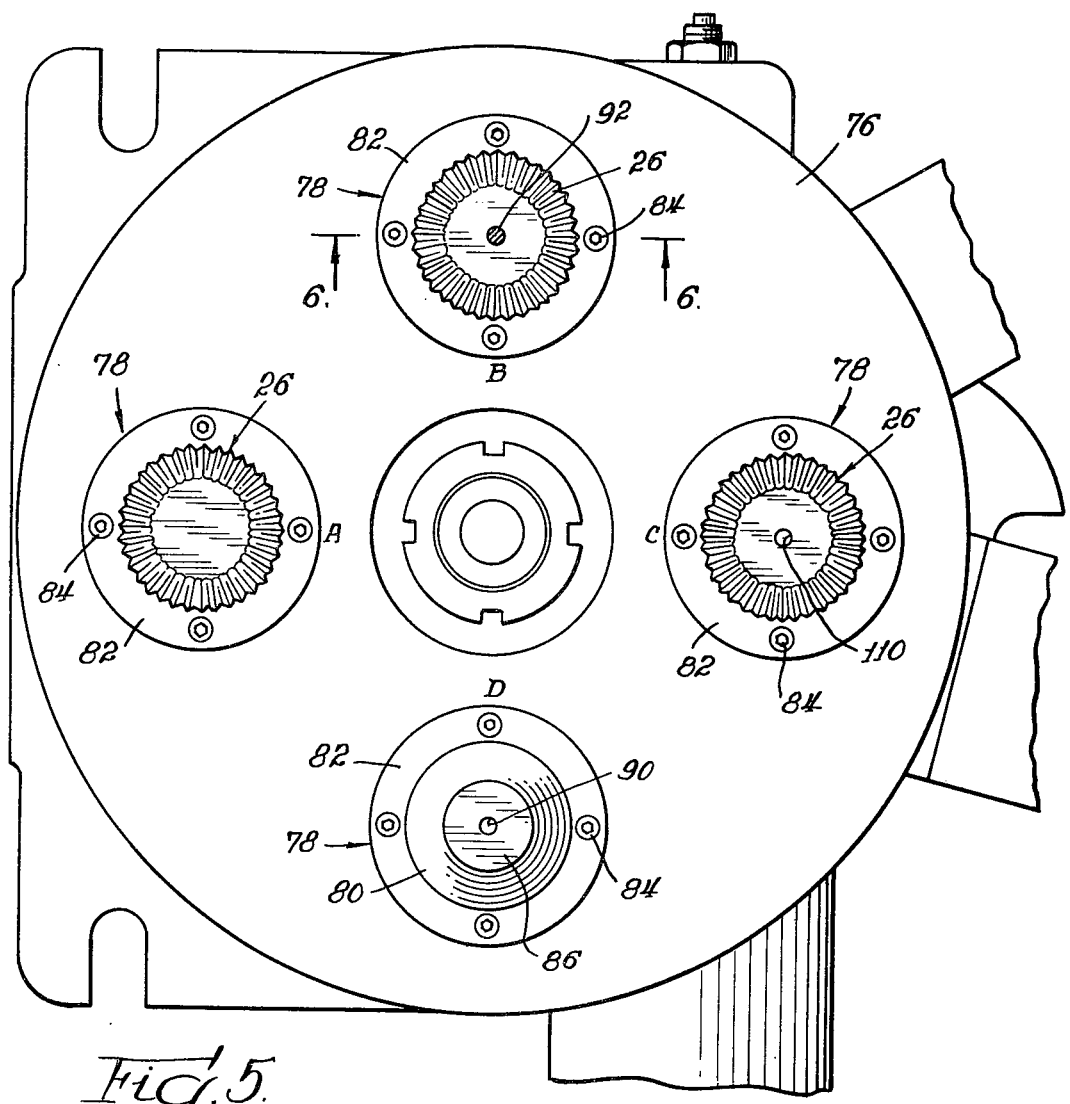
FIG. 5 is a plan view of the punching die assembly.

FIG. 5 shows in fragmentary form a suitable die machine for this purpose, including a turntable 76 adapted to be rotated by indexing means, not shown, from loading station A to punching station B to discharge or unloading station C. A fourth station, D, is shown which may be utilized for unloading or for loading as desired, or may be omitted entirely.

Each station is provided with a punch die 78. Each punching die 78 is provided with a base 80 having an annular flange 82 at the bottom thereof. The base 80 is secured to the turntable 76 by means of fasteners 84 in the flanges 82.

The base of the die 80 is shaped like a truncated cone, the top surface of which has essentially the same diameter as the bottom of the filter cups and the sides of which slope outwardly and downwardly as shown at 88 substantially at the angle of flare of the nested cups after they are discharged from the cooling tube. Ordinarily, it will be sufficient if the sides slope outwardly and downwardly at an angle of about 10 to about 30 degrees.

Figure 6:
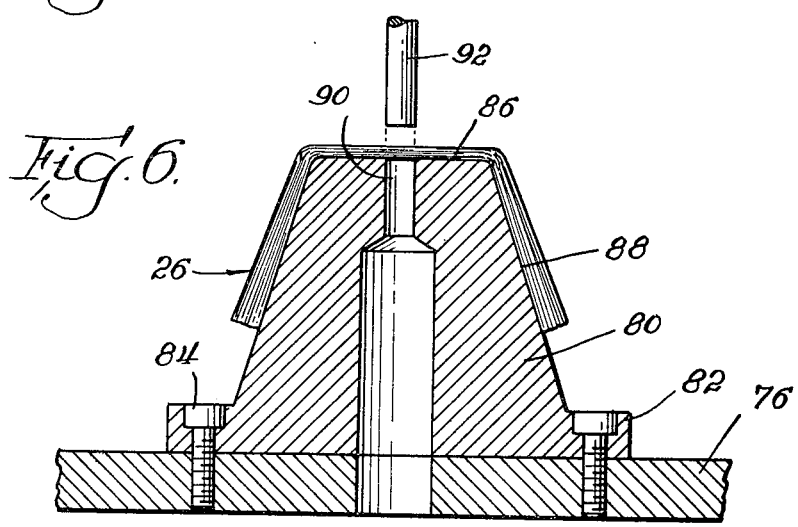
FIG. 6 is a cross-section taken along line 6—6 of FIG. 5.

The top of the die base 80 has an axial die-hole 90, axially aligned with punch 92. When the nested cups 26 are placed on the die base 80, as shown in FIG. 6, the cups are automatically centered so that the punch 92 will punch a hole in the bottom of the nested cups which is at the exact center of the several cups in the nest. If desired, a clamp, not shown, may be arranged to press the nested cups firmly in contact with the top 86 of the die base 80 before the punching operation.

The individual cups are proportioned to conform with the basket 94 of a standard percolator, not shown. The basket in the form shown in FIG. 7 has an upstanding sidewall 96 and a bottom 98. The bottom is perforated and, if desired, part or all of the sidewall 96 may be perforated. Extending axially upwardly through the basket 94 is a wand 100. In the form shown, the basket 94 has an axial collar 102 projecting upwardly from the bottom 98 of the basket. The wand 100 has a slidable fit with the collar 102 so that the basket can be removed from the wand and replaced as desired. In some forms of percolators, the basket rests on spring 104 which is affixed to the wand 100 at some lower point 106. In other forms, not shown, the collar 102 is omitted and the bottom 98 of the basket is attached to the wand.

Figure 2:
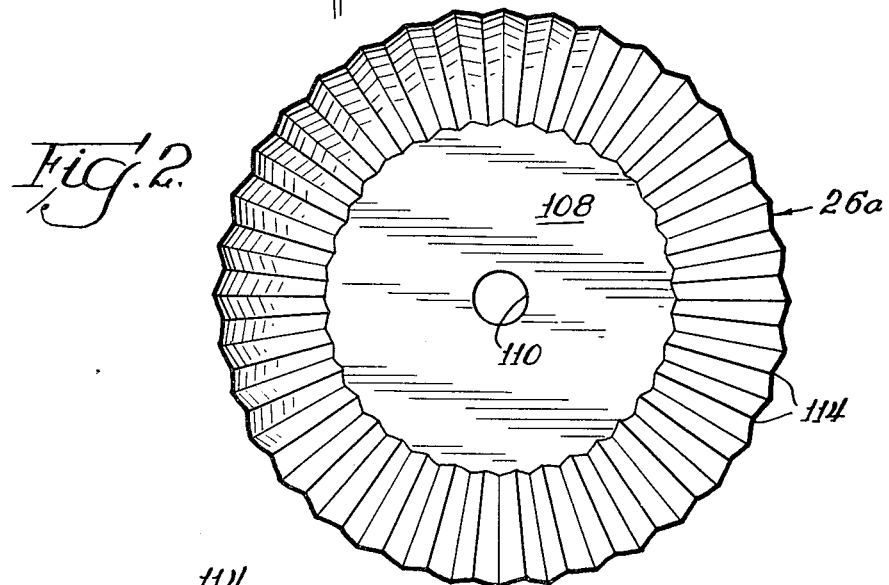
FIG. 2 is a plan view of a filter cup according to the invention.
Figure 3:
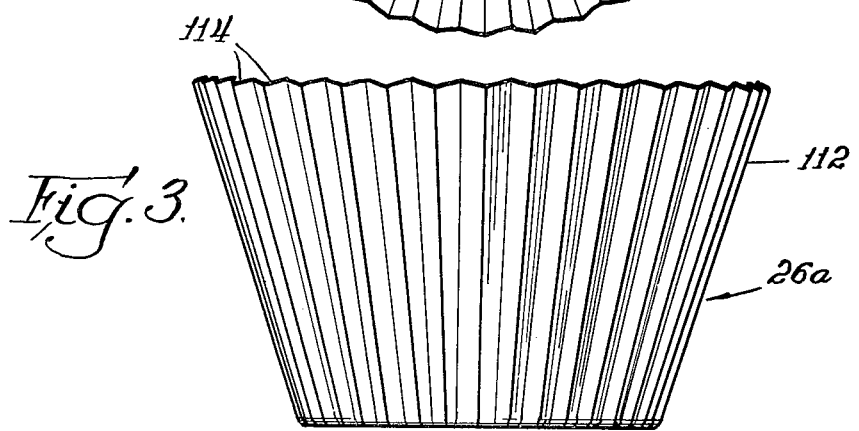
FIG. 3 is a side view of the same cup.

The filter cup 26a produced by the process of the invention is shown in FIGS. 2 and 3. It has an annular bottom 108 with an axial opening 110 of the same diameter as the collar 102, and upstanding sidewalls 112. The upstanding sidewalls 112 are provided with a plurality of flutes 114 about the periphery thereof which function, as shown in FIGS. 7, and 8 like accordion pleats when the filter cup is placed in the basket of the percolator, thus acting to take up the surplus paper and allowing the cup to assume roughly the cylindrical shape of the basket of the percolator, with the outermost apices of the flutes being substantially entirely in contiguous relationship with the inner wall of the basket of the percolator.

In order for the filter cup to effectively assume the cylindrical shape of the basket of the percolator, it is advantageous that the center hole be accurately centered and the flutes be relatively small. Preferably, there should be at least 1 flute for every 10 degrees of the periphery of the annular base of the filter cup and, advantageously, 1 flute for at least every 15 degrees. Advantageously, also, the filter paper is composed essentially of bleached cellulose fiber from chemically prepared wood pulp which is uncalendered and unsized, is creped about 6 to about 15 percent, has a moisture content between about 3 and about 6 percent, and has about 28 to about 40 pound basis weight. When the filter cups are so constructed and the flutes are heat-set by adequate heating in the heating tube, and adequate cooling in the cooling tube, a filter cup is provided which is inexpensive to make, elegant in appearance, and efficient for its intended purpose.

The cooling tube 30, advantageously, is perforated as shown at 116 and, if desired, the perforations may extend up into the portion of the heating tube 28 which is covered by the heating element 54b.

The female member 36 of the forming die 22 is dish-shaped or concave, whereas the male portion 38 is convex. This facilitates the pulling out of the annular fluted portions from the die when the pusher 64 engages the central portion of the cut and formed composite web to push it into the tubular extension 48. Thus, the annular portion of the female member 36 slopes upwardly as shown in FIG. 4 and the annular portion of the male member 38 has a complementary slope. The angle of slope ordinarily is around 10 to 15 degrees, but, if desired, may range from an angle of about 10 to about 30 degrees.

The length of the heating tube 28 and the length of the cooling tube 30 is not critical and may be varied over a wide range consistent with the purpose of obtaining a good set of the flutes in the filter cup.

It is to be understood that the invention is not to be limited to the exact details of the operation or structure shown and described as obvious modifications and equivalents will be apparent to one skilled in the art.

We claim:

1. A process for making filter cups having an annular bottom and integral upstanding fluted sides projecting upwardly from the periphery of said annular bottom which comprises
   (1) assembling into a composite web, a plurality of webs of filter paper composed essentially of bleached cellulose fiber from chemically processed wood pulp, which is uncalendered, is unsized, is creped from about 6 to about 15 percent, and has a basis weight between about 28 and about 40 pounds.
   (2) passing the composite web into a die which cuts the composite web into a circular composite disc and forms flutes therein radiating out from a central circuit portion,
   (3) forcing the fluted circular component disc into nested cups and moving the nested cups axially through a cylindrical tube having substantially the diameter of the central portion of the nested cups,
   (4) heating and cooling the nested cups while in said tube,
   (5) transferring the cooled nested cups from said tube to a frusto-conical die having a circular top having substantially the same diameter as the central portion of the nested cups and a central die-hole, said die having sides flaring outwardly and downwardly from said circular top at an angle approximating the natural flare of the nested cups, and
   (6) punching an axial hole in said nested cups while on said die by means of a punch complementary to said die.

2. The process of claim 1, in which the sides of the die flare outwardly and downwardly at an angle of between about 10 and 30 degrees.

3. The process of claim 1, in which the cutting and fluting die has complementary pairs of fluting lands and grooves at least every 15 degrees.

4. The process of claim 1, in which the cutting and fluting die has complementary pairs of fluting lands and grooves at least every 10 degrees.

5. A process for making filter cups having an annular bottom and integral upstanding fluted sides projecting upwardly from the periphery of said annular bottom which comprises
   (1) assembling into a composite web, a plurality of webs of filter paper composed essentially of bleached cellulose fiber from chemically processed wood pulp, which is uncalendered, is unsized, is creped from about 6 to about 15 percent, and has a basis weight between about 28 and about 40 pounds,
   (2) passing the composite web into a die which cuts the composite web into circular composite discs and forms flutes therein radiating out from a central circular portion,
   (3) forcing the fluted circular component discs into nested cups and moving the nested cups axially through a cylindrical tube having substantially the diameter of the central portion of the nested cups,
   (4) heating the nested cups while confined in said tube in an elongate front section thereof,
   (5) cooling the heated nested cups while confined in said tube in an elongate end section thereof, by exposure to the ambient atmosphere through perforations therein, and
   (6) punching an axial hole in said nested cups.

6. The process of claim 5, which further comprises transferring the cold nested cups from said perforate section to a frusto-conical die having a circular top having substantially the same diameter as the central portion of the nested cups and a central die-hole, said die having sides flaring outwardly and downwardly from said circular top at an angle approximating the natural flare of the nested cups, and there punching said axial hole in said nested cups while on said die by means of a punch complementary to said die.

7. The process of claim 5, in which the heating is effected by exposure to a heating means while said nested cups are confined in an imperforate section of said tube.

8. The process of claim 7, which further comprises transferring the cold nested cups from said perforate section to a frusto-conical die having a circular top having substantially the same diameter as the central portion of the nested cups and a central die-hole, said die having sides flaring outwardly and downwardly from said circular top at an angle approximating the natural flare of the nested cups, and there punching said axial hole in said nested cups while on said die by means of a punch complementary to said die.

9. The process of claim 5, in which the sides of the punch die flare outwardly and downwardly at an angle of between about 10 and 30 degrees.

10. The process of claim 5, in which the cutting and fluting die has complementary pairs of fluting lands and grooves at least every 15 degrees.

11. The process of claim 5, in which the cutting and fluting die has complementary pairs of fluting lands and grooves at least every 10 degrees.

12. The process of claim 9, in which the sides of the punch die flare outwardly and downwardly at an angle of between about 10 and 30 degrees.

13. The process of claim 8, in which the cutting and fluting die has complementary pairs of fluting lands and grooves at least every 15 degrees.

14. The process of claim 8, in which the cutting and fluting die has complementary pairs of fluting lands and grooves at least every 10 degrees.

* * * * *

UNITED STATES PATENT AND TRADEMARK OFFICE
CERTIFICATE OF CORRECTION

PATENT NO. : 4,235,160

DATED : November 25, 1980

INVENTOR(S) : Wallace E. Olney and Robert G. Wright

It is certified that error appears in the above—identified patent and that said Letters Patent are hereby corrected as shown below:

Col. 2, line 24; "accordion" should read -- accordian --

Col. 3, line 34; "lapped" should read -- lagged --

Col. 4, line 46; "7, and 8 like" should read -- 7 and 8, like --

Col. 5, line 43; "circuit" should read -- circular --

Col. 6, line 59; "claim 9," should read -- claim 8, --

Signed and Sealed this

Ninth Day of June 1981

[SEAL]

Attest:

RENE D. TEGTMEYER

Attesting Officer     Acting Commissioner of Patents and Trademarks